US012768340B2

(12) United States Patent
Bandera

(10) Patent No.: US 12,768,340 B2
(45) Date of Patent: Oct. 20, 2026

(54) FLUID ROTARY JOINT FOR GIMBALS IN ELECTRIC PROPULSION THRUSTERS

(71) Applicant: Honeybee Robotics, LLC, Longmont, CO (US)

(72) Inventor: Pablo Bandera, Longmont, CO (US)

(73) Assignee: HONEYBEE ROBOTICS, LLC, Longmont, CO (US)

( * ) Notice: Subject to any disclaimer, the term of this patent is extended or adjusted under 35 U.S.C. 154(b) by 0 days.

(21) Appl. No.: 19/037,416

(22) Filed: Jan. 27, 2025

(65) Prior Publication Data

US 2026/0218688 A1 Jul. 30, 2026

(51) Int. Cl.
*F03H 99/00* (2009.01)
*F16C 11/04* (2006.01)
*F16M 11/20* (2006.01)
*F16M 13/02* (2006.01)

(52) U.S. Cl.
CPC .............. *F03H 99/00* (2013.01); *F16C 11/04* (2013.01); *F16M 11/2071* (2013.01); *F16M 13/022* (2013.01)

(58) Field of Classification Search
CPC ........... B25J 9/126; F03H 99/00; F16C 11/04; F16M 11/2071; F16M 13/022
See application file for complete search history.

(56) References Cited

U.S. PATENT DOCUMENTS 3,202,061 A * 8/1965 Johnston ................. E05F 15/50 92/64
3,384,325 A 5/1968 Hermann
3,977,648 A * 8/1976 Sigmon ................. F15B 15/103 92/39
4,712,780 A * 12/1987 Ficht .................. B62D 55/1125 280/124.13
5,409,431 A 4/1995 Vranish
5,597,147 A * 1/1997 Hashi ..................... F16M 13/00 16/349
5,887,823 A 3/1999 Ziavras et al.
8,535,198 B2 9/2013 Fong et al.
9,375,852 B2 6/2016 Rose et al.
2010/0296862 A1 11/2010 Baudasse
2011/0067380 A1 3/2011 Laine
(Continued)

FOREIGN PATENT DOCUMENTS

CN 101975248 A 2/2011
CN 111828557 B 8/2022
(Continued)

OTHER PUBLICATIONS

LMO, Autonomous Space Systems, Integrated End-to-end Hardware Solutions. Retrieved online at: <https://www.lmo.space/technology-solutions/hardware/.> 18 pages. Retrieved Jun. 4, 2024.

*Primary Examiner* — David P. Olynick
(74) *Attorney, Agent, or Firm* — McCarter & English LLP

(57) ABSTRACT

A rotary joint, a gimbal, and an electric thruster system are provided. The rotary joint includes a channel guide configured to be disposed coaxial with a shaft. A bellows is operably coupled to a member on a first end and a component on a second end, the bellows fluidly coupling the member to the component, the bellows being configured to extend along an arc shaped path about the shaft between a first position and a second position.

9 Claims, 5 Drawing Sheets

(56) References Cited

U.S. PATENT DOCUMENTS

| | | | | |
|---|---|---|---|---|
| 2016/0025150 | A1* | 1/2016 | Bachmaier | B25J 9/126<br>901/19 |
| 2018/0155064 | A1 | 6/2018 | Haertel et al. | |
| 2020/0200231 | A1* | 6/2020 | Brewer | F16F 9/3207 |
| 2023/0257137 | A1 | 8/2023 | Freestone et al. | |

FOREIGN PATENT DOCUMENTS

| | | | |
|---|---|---|---|
| EP | 2186597 | A1 | 5/2010 |
| GB | 2123896 | A | 2/1984 |
| RU | 184598 | U1 | 10/2018 |

* cited by examiner

FLUID ROTARY JOINT FOR GIMBALS IN ELECTRIC PROPULSION THRUSTERS

BACKGROUND OF THE DISCLOSURE

The subject matter disclosed herein relates to a rotary joint and in particular to a rotary joint that is capable to transferring a fluid across a rotating interface while eliminating or reducing leakage.

Spacecraft and/or satellites may perform propulsion operations in space. Some of these propulsion operations may include attitude and momentum control, orbit raising, orbit insertion and maintenance, orbit repositioning and/or de-orbit maneuvers. Other propulsion operations may include escaping orbits for interplanetary or extra-solar system missions and/or injection maneuvers to initiate orbit around another planet, moon, etc. Thrust is achieved by acceleration of propellants. Propellants may be accelerated substantially by pressure differences, cold or hot gas systems, chemical reactions, and electrical and magnetic interactions. One type of propulsion system is referred to as electric propulsion (including ion propulsion systems, stationary plasma systems, Hall effect thrusters, and magnetoplasma thrusters).

To perform these propulsion operations, some satellites use cold gas systems, or chemical systems, or combinations of cold gas and chemical systems, or combinations of cold gas, chemical and electric propulsion systems. The propulsion system is mounted to a gimbal having rotary joints to allow for two-axis or three-axis motion of a thruster. This allows for thrust to be directed along a desired vector to achieve the desired movement. A typical fuel for these propulsion systems includes xenon or hydrazine. The fuel is routed to the thruster using a high pressure conduits from a fuel tank to the thruster. To accommodate the motion of the thruster, coiled propellant lines are provided that are capable of bending are used to connect the thruster to the fuel tank.

While existing rotary joints for propulsion systems are suitable for their intended purposes the need for improvement remains, particularly in providing a rotary joint and a system for transferring a fluid through a rotary joint having the features described herein.

BRIEF DESCRIPTION OF THE DISCLOSURE

According to one aspect of the disclosure, a rotary joint is provided. The rotary joint includes a channel guide configured to be disposed coaxial with a shaft. A bellows is operably coupled to a member on a first end and a component on a second end, the bellows fluidly coupling the member to the component, the bellows being configured to extend along an arc shaped path about the shaft between a first position and a second position.

In addition to one or more of the features described herein, or as an alternative, further embodiments of the rotary joint may include the member being stationary relative to the component; and the component being configured to rotate about the shaft.

In addition to one or more of the features described herein, or as an alternative, further embodiments of the rotary joint may include the member being configured to rotate about the shaft; and the component being configure to rotate about the shaft independently from the member.

In addition to one or more of the features described herein, or as an alternative, further embodiments of the rotary joint may include the channel guide having a housing with a curved outer wall, the bellows being disposed between the outer wall and the shaft.

In addition to one or more of the features described herein, or as an alternative, further embodiments of the rotary joint may include an arc shaped conduit coupled between a third end of the bellows and the component.

In addition to one or more of the features described herein, or as an alternative, further embodiments of the rotary joint may include the channel guide includes a curved inner wall disposed between the shaft and the outer wall, a first end wall and a second end wall, the inner wall, the outer wall, the first end wall, and second end wall cooperating to define an interior space.

In addition to one or more of the features described herein, or as an alternative, further embodiments of the rotary joint may include a fourth end of the bellows being coupled to the second end wall and the third end moves between the first position and the second position.

In addition to one or more of the features described herein, or as an alternative, further embodiments of the rotary joint may include the arc shaped conduit being fluidly coupled to the interior space.

In addition to one or more of the features described herein, or as an alternative, further embodiments of the rotary joint may include the channel guide having a port configured to fluidly couple the interior space to a fluid source.

According to another aspect of the disclosure, a gimbal for a propulsion system is provided. The gimbal comprising a first rotary joint defining a first axis of rotation. The first rotary joint includes a first channel guide configured to be disposed coaxial with a first shaft, and a first bellows operably coupled to a first member on a first end and a first component on a second end, the first bellows fluidly coupling the first member to the first component, the first bellows being configured to extend along a first arc shaped path about the first shaft between a first position and a second position. A second rotary joint is provided defining a second axis of rotation, the second axis of rotation being perpendicular to the first axis of rotation, the second rotary joint includes a second channel guide configured to be disposed coaxial with a second shaft, and a second bellows operably coupled to a second member on a third end and a second component on a fourth end, the second member being fluidly coupled to the first component, the second bellows fluidly coupling the second member to the second component, the second bellows being configured to extend along a second arc shaped path about the second shaft between a third position and a fourth position.

In addition to one or more of the features described herein, or as an alternative, further embodiments of the gimbal may include the first channel guide having a housing with a curved outer wall, a curved inner wall, a first end wall and a second end wall, the curved outer wall, the curved inner wall, the first end wall and the second end wall defining an interior space, and the bellows being disposed at least partially within the interior space.

In addition to one or more of the features described herein, or as an alternative, further embodiments of the gimbal may include a first arc shaped conduit coupled between a first end of the first bellows and the first component.

In addition to one or more of the features described herein, or as an alternative, further embodiments of the gimbal may include a second end of the first bellows being coupled to the second end wall and the first end moves between the first position and the second position.

In addition to one or more of the features described herein, or as an alternative, further embodiments of the gimbal may include the arc shaped conduit being fluidly coupled to the interior space.

In addition to one or more of the features described herein, or as an alternative, further embodiments of the gimbal may include the first channel guide having a first port configured to fluidly couple the interior space to a fluid source; and the second channel guide having a second port configured to fluidly couple the second bellows to a thruster of the propulsion system.

According to yet another aspect of the disclosure an electric thruster system is provided. The electric thruster system includes a fuel source, at least one thruster, and a gimbal. The gimbal being coupled to the at least one thruster, the gimbal having a first axis of rotation and a second axis of rotation, the first axis of rotating having first bellows configured to having at least one end moving along a first arc shaped path, the second axis of rotation having a second bellows configured to having at least one end moving along a second arc shaped path, the first bellows being fluidly coupled between the fuel source and the second bellows, the second bellows being fluidly coupled between the first bellows and the at least one thruster.

In addition to one or more of the features described herein, or as an alternative, further embodiments of the electric thruster system may include the first axis of rotation having a first channel guide configured to be disposed coaxial with a first shaft, the first channel guide having an first interior space, the first bellows being at least partially disposed within the first interior space. The second axis of rotation has a second channel guide configured to be disposed coaxial with a second shaft, the second bellows being at least partially disposed within the second interior space.

In addition to one or more of the features described herein, or as an alternative, further embodiments of the electric thruster system may include the first axis of rotation having a first conduit coupled to one end of the first bellows, the first conduit being fluidly coupled to the first interior space. The second axis of rotation having a second conduit coupled to one end of the second bellows, the second conduit being fluidly coupled to the second interior space.

In addition to one or more of the features described herein, or as an alternative, further embodiments of the electric thruster system may include the first interior space being fluidly coupled to the fuel source and the second conduit is fluidly coupled to the at least one thruster.

In addition to one or more of the features described herein, or as an alternative, further embodiments of the electric thruster system may include the first conduit being fluidly coupled between the first interior space and the second interior space.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Embodiments of the present disclosure provide for a rotary joint that allows for the transfer of fluids, such as a fuel for example. Further embodiments of the present disclosure provide for a rotary joint that is compact in size without the use of long flexible or coiled fluid lines. Further embodiments of the present disclosure provide for a rotary joint that preloads in one direction through a range of motion to provide a preload for planetary gears and removes backlash. Still further embodiments of the present disclosure provide for a gimbal having multi-axis rotary joints that are configured to transfer a fluid therethrough. Still further embodiments of the present disclosure provide for a propulsion system, such as an electric thruster system for example, that includes a compact in size gimbal assembly that allows for the flow of a high pressure fuel from a storage tank to a thruster.

It should be appreciated that while embodiments herein may refer to a particular number of axes or degrees-of-freedom for motion, such as a two-axis system for example, this is for example purposes and the claims should not be so limited. For example, in other embodiments the system may be a three-axis system without deviating from the teachings herein.

Figure 1:
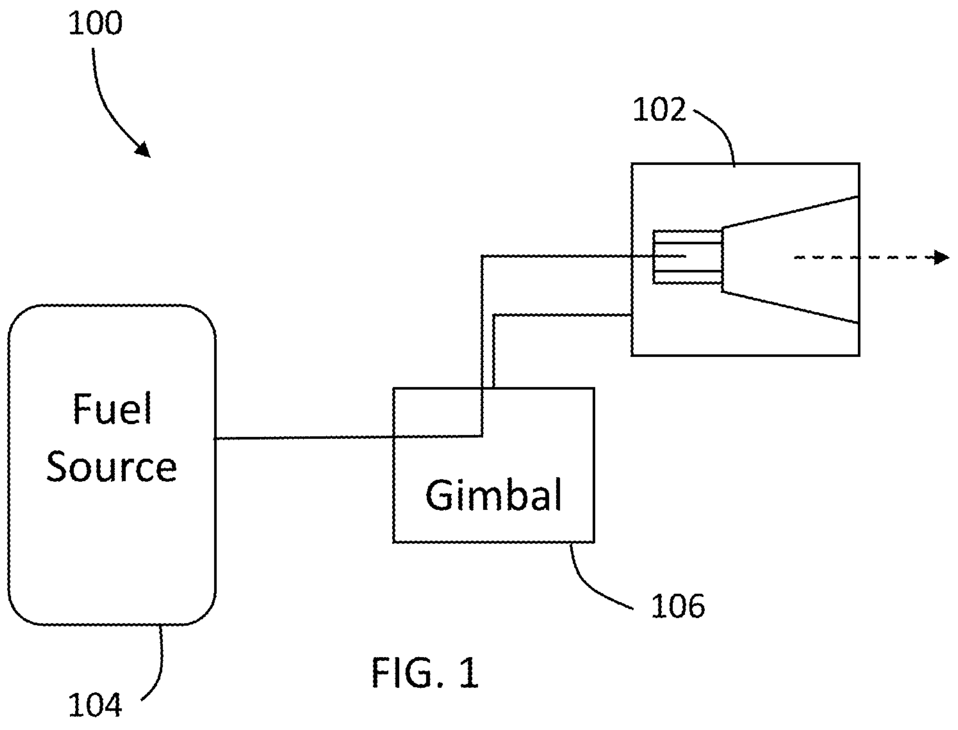
FIG. 1 is a schematic illustration of a propulsion system in accordance with an embodiment.

Referring now to FIG. 1, an embodiment is shown of a propulsion system 100 that is configured to emit thrust along a desired vector using a movable thruster 102. In an embodiment, the propulsion system 100 is an electric thruster propulsion system that uses a high pressure fluid, such as xenon or hydrazine for example. It should be appreciated that while embodiments herein may refer to the propulsion system as using an electric thruster for a vehicle such as a spacecraft, this is for example purposes and the claims should not be so limited. In other embodiments, the rotary joint disclosed herein may be used with other types of thrusters or vehicles without deviating from the teachings herein. For example, in an embodiment, the thruster may be a turbojet or turbo fan on a vertical takeoff and landing aircraft for example. In still further embodiments, the rotary joint may be used in a chemical propulsion system, a nuclear thermal system, an ion propulsion system, a hall-effect propulsion system, or a thermal/resistojet propulsion system for example. In yet still further embodiments, the vehicle the propulsion system is used with may be a spacecraft, a satellite, an aircraft, a ground-based vehicle, a boat or ship, or a submarine for example.

The system includes a fuel source 104, such as a fuel tank for example. The fuel source 104 is coupled to a gimbal 106 that is configured to transfer the fuel to the thruster 102. The thruster 102 receives the fuel and performs an action, such as accelerating the received fuel using electric, magnetic or electrostatic fields to push ions out of the thruster to generate thrust and move the vehicle.

In an embodiment, the gimbal 106 is a multi-axis gimbal configured to rotate the thruster 102 independently from the fuel source 104. In an embodiment, the gimbal is a two-axis gimbal having two perpendicular axis of rotation. It should be appreciated that while embodiments herein refer to the gimbal as having two axis, this is for example purposes and the claims should not be so limited. In other embodiments, the gimbal may have more than 2-axes of rotation such as three, four, or five axes for example, without deviating from the teachings herein.

Figure 2:
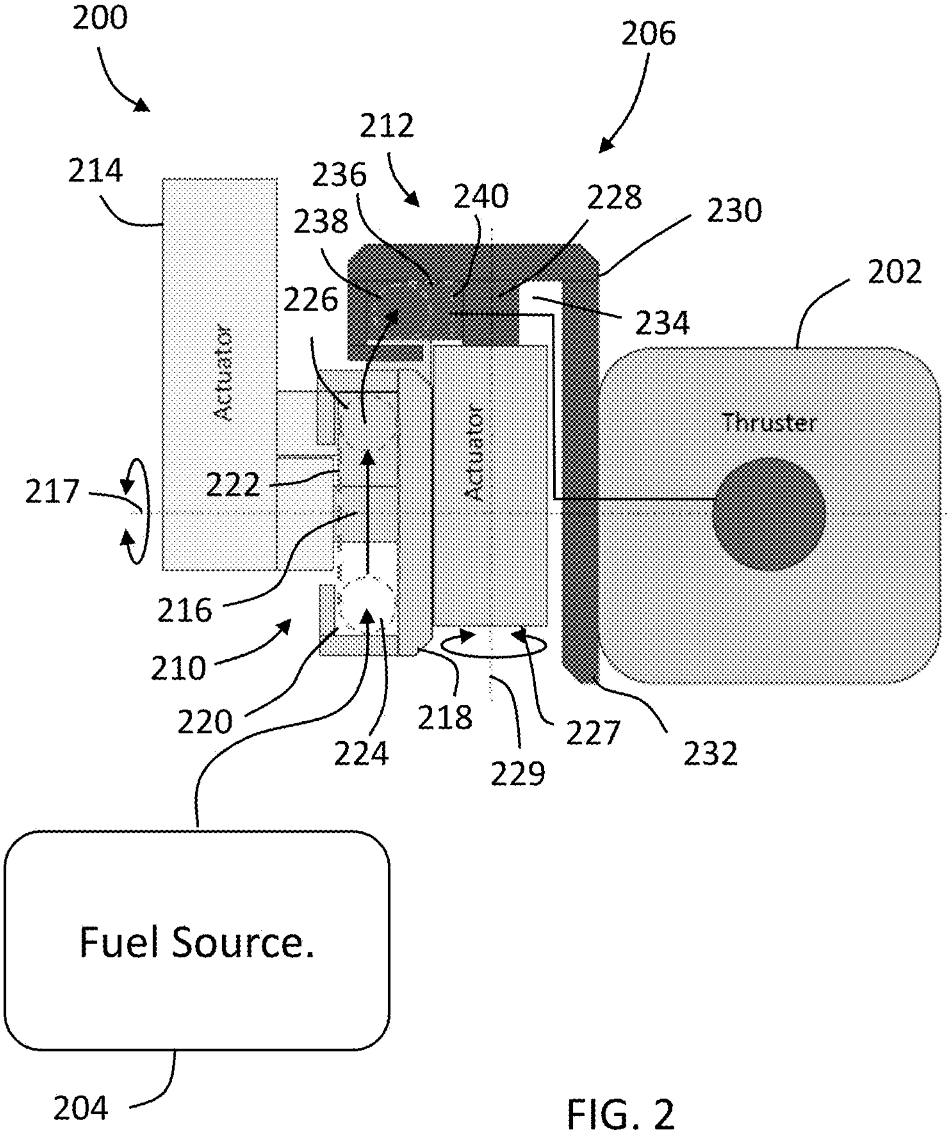
FIG. 2 is a schematic illustration of a propulsion system in accordance with another embodiment.

Referring now to FIG. 2, another embodiment is shown of a propulsion system 200. In this embodiment, the system 200 includes a thruster 202 coupled to a gimbal 206. A fuel source 204 is coupled to a first axis of the gimbal 206.

In this embodiment, the gimbal 204 includes a first axis assembly 210 and a second axis assembly 212. The first axis assembly 210 includes a first actuator 214 having an output shaft 216 that rotates about an axis 217. Operably coupled to the output shaft 216 is a channel guide 218. The channel guide 218 includes an interior area 220 having a first bellows 222 disposed therein. In an embodiment, the channel guide does not rotate with the shaft 216, but is fixed relative to the actuator 214. The bellows 222 includes having a first end 224 and a second end 226. In an embodiment, similar to that shown and described with respect to FIG. 3A-4B, the first end 224 is fixed relative to the shaft 216. In other words, the first end 224 does not rotate with the shaft 226 while the second end 226 moves as the shaft rotates. In this embodiment, the end 224 is configured to receive a fluid from the fuel source 204.

Figure 5A:
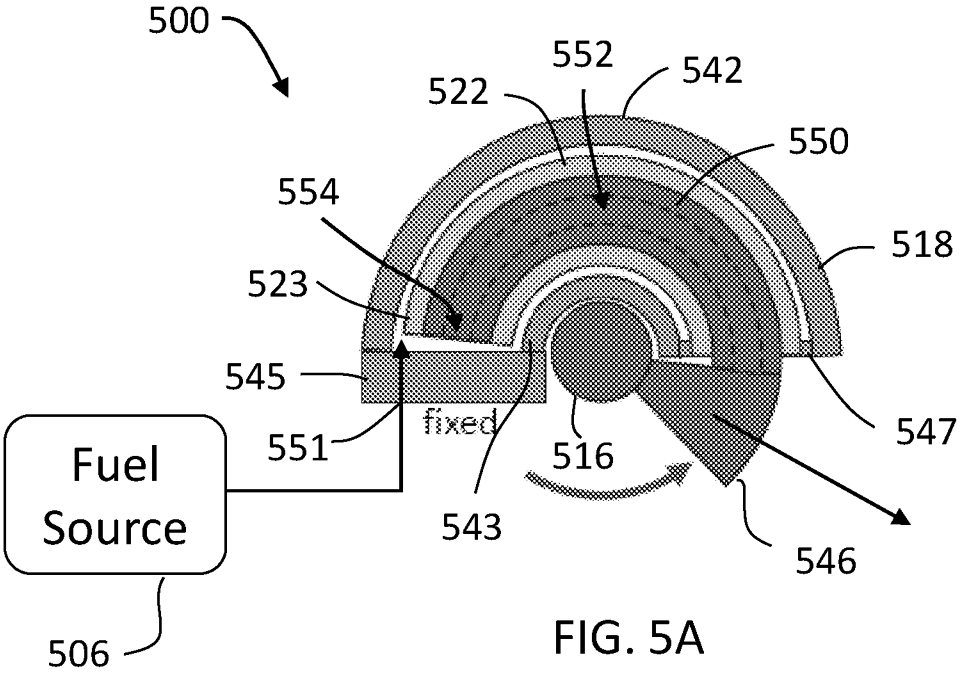
FIG. 5A-5B are schematic illustrations of a rotary joint in accordance with yet another embodiment.
Figure 5B:
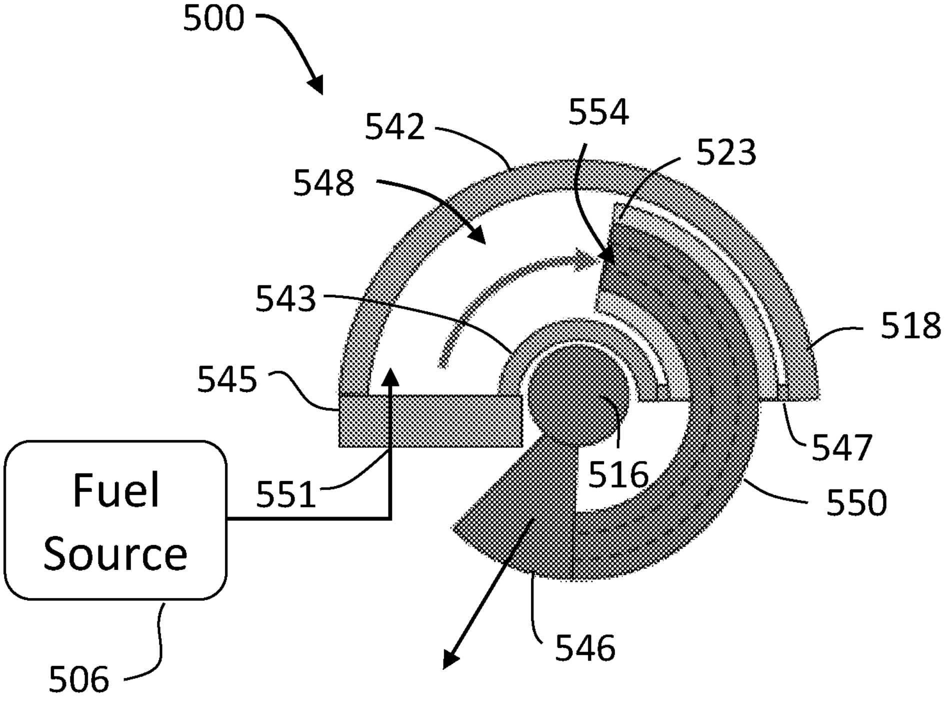

In another embodiment, similar to that shown and described with respect to FIG. 5A-5B, the interior area defines a sealed volume or chamber that is fluidly coupled to the fuel source 204. In this embodiment, the second end is coupled to the channel guide 218 and the first end moves in response to rotation of the shaft 216. As described in more detail herein, a tube member that is coupled to and supported by the first bellows is fluidly coupled to the second axis assembly 212.

As used herein, the bellows is a component that is configured to change in size during operation. In an embodiment, the bellows is a component with accordion or concertinaed sides that allow the component to expand or contract during operation. In embodiments herein, the bellows is configured to expand and contract along an arcuate path that is coaxial with a shaft.

Coupled to the first axis assembly 210 is the second axis assembly 212. It should be appreciated that the second axis assembly 212 rotates with the shaft 216 about the axis 217. The second axis assembly 212 includes an actuator 227 having an output shaft 228 that rotates about an axis 229. Coupled to the shaft 228 is a second channel guide 230. The channel guide 230 includes a flange 232 that is coupled to the thruster 202.

Similar to the first channel guide 218, the second channel guide includes an interior area 234. A second bellows 236 is disposed within the interior area 234. The second bellows 236 is configured expand and contract along an arcuate path about the axis 229 in response to rotation of the shaft 228. The second bellows includes a first end 238 that is fluidly coupled to the second end 226 of the first bellows 222 to receive fuel from fuel source 204.

In one embodiment, similar to that shown and described with reference to FIG. 3A-4B, the first end 238 is fixed relative to the second end 226. In other words, there is no relative movement between the two components. In this embodiment, the second end 240 is fluidly coupled to the thruster 202. In another embodiment, similar to that shown and described with reference to FIG. 5A-5B, the second channel guide 230 is coupled to the actuator 227 and the second end 240 moves along an arcuate path in response to rotation of the shaft 228. In this embodiment, a tube member coupled to, and supported by, the bellows 236 is fluidly coupled between the interior area 234 and the thruster 202.

It should be appreciated that the first axis assembly 210 and the second axis assembly 212 cooperate to allow orienting of the thruster 202 while allowing a fluid from the fuel source 204 to flow through the gimbal 204 to the thruster 202 in a compact manner.

Figure 3A:
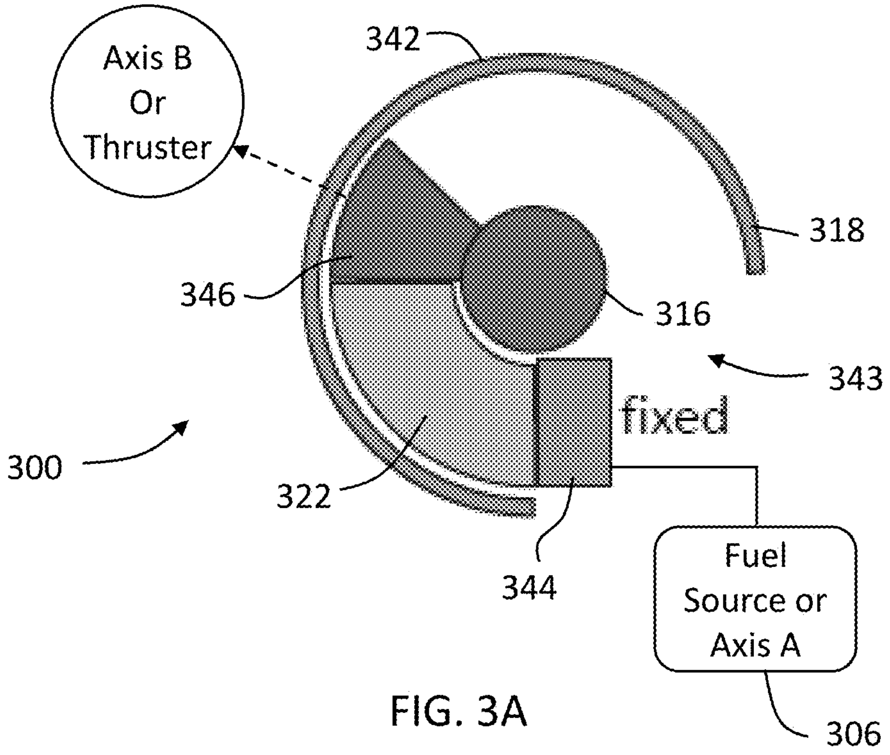
FIG. 3A-3B are schematic illustrations of a rotary joint in accordance with an embodiment.
Figure 3B:
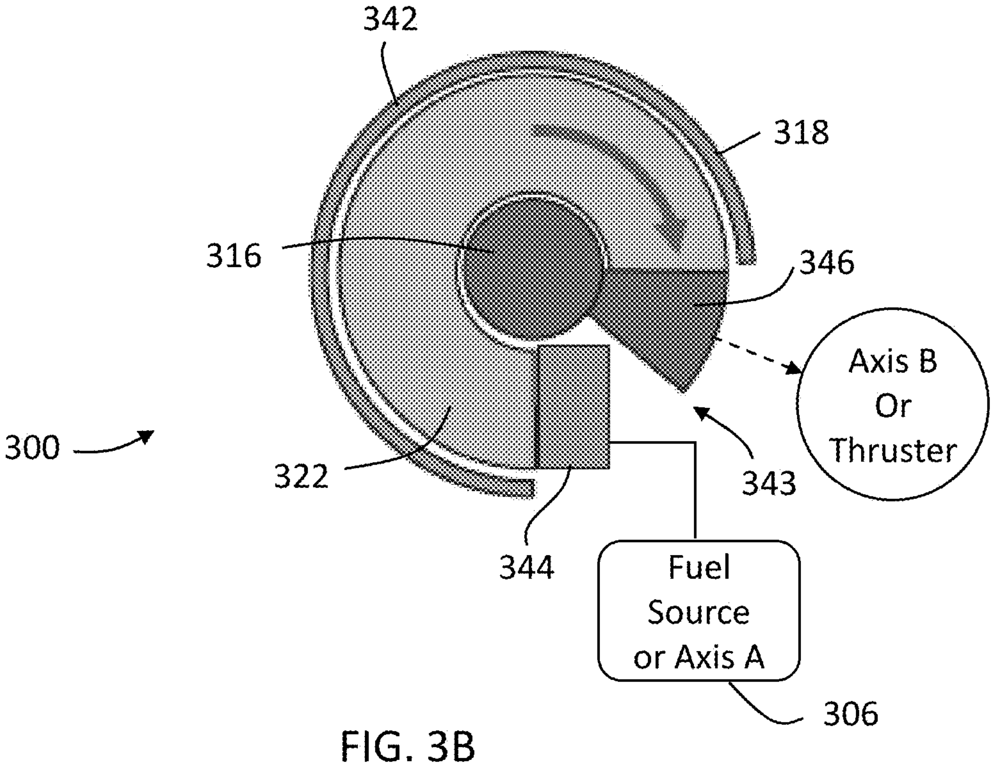

Referring now to FIGS. 3A and 3B, an embodiment of a rotary joint 300 is shown. The rotary joint 300 may be used in the first axis assembly 210 or second axis assembly 212 for example, however, it should be appreciated that the rotary joint 300 may be used in any rotating assembly where it is desired to flow a fluid therethrough. The rotary joint 300 include a channel guide 318 having an outer wall 342 that is co-axial with a shaft 316. In an embodiment, the outer wall 342 may have a section or gap 343 between the ends of the wall. In the illustrated embodiment, the rotary joint 300 further includes a fixed port 344 and a rotating port 346. In an embodiment, the fixed port 344 is fluidly coupled to the fuel source 304. The fixed port 344 is fixed relative to, or is incorporated in, the channel guide 318. The rotating port 346 is coupled to and rotates with the shaft 316. In an embodiment, the rotating port 346 has an outlet that is fluidly coupled to another axis assembly, such as axis assembly 212 for example.

Disposed between the fixed port 344 and rotating port 346 is a bellows 322. The bellows 322 is configured to expand and contract along an arcuate path as the shaft 316 rotates. In an embodiment, the arcuate path is coaxial with the shaft 326. In an embodiment, the bellows 322 is hollow and provides a fluid connection between the fixed port 344 and the rotating port 346. In an embodiment, the bellows 322 is sealingly coupled to the fixed port 344 and rotating port 346 to allow a pressurized fluid to flow therethrough. In an embodiment, the coupling of the bellows 322 to the fixed port 344 and rotating port 346 is hermetically sealed. In an embodiment, the fluid is at a pressure of up to 70 psi. In operation, the shaft 316 and rotating port 346 rotate between a first position (FIG. 3A) and a second position (FIG. 3B). As the shaft 316 rotates from the first position to the second position, the bellows 322 expands to allow the fixed port 344 to remain fluidly coupled to the rotating port 346. Similarly, as the shaft 317 rotates from the second position to the first portion, the bellows 322 contracts. In the illustrated embodiment, the bellows 322 is configured to expand over a range of +/−90 degrees. However, it should be appreciated that the rotary joint 300 may be configured to allow the bellows 322 to expand or contract over other ranges that are less than +/−90 degrees.

Figure 4A:
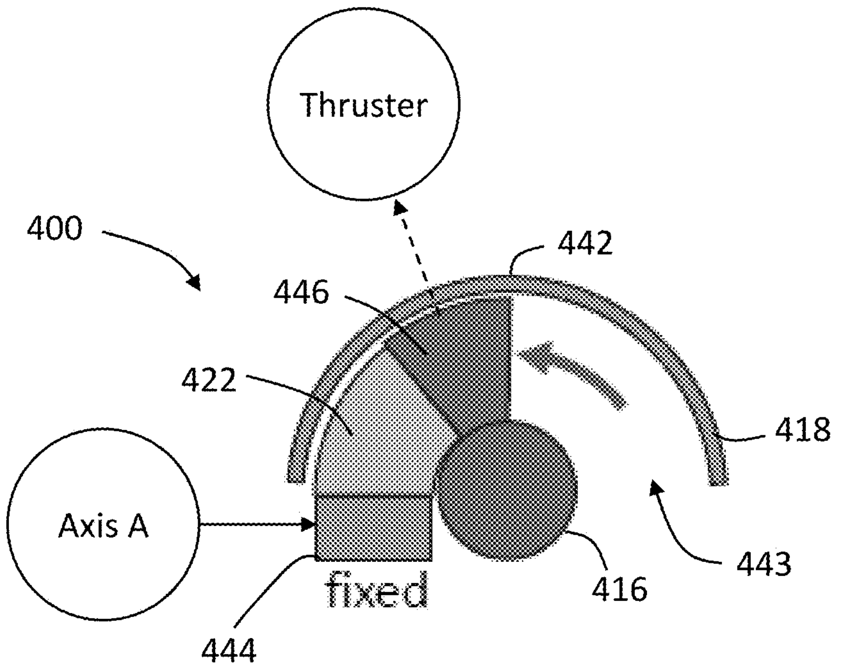
FIG. 4A-4B are schematic illustrations of a rotary joint in accordance with another embodiment.
Figure 4B:
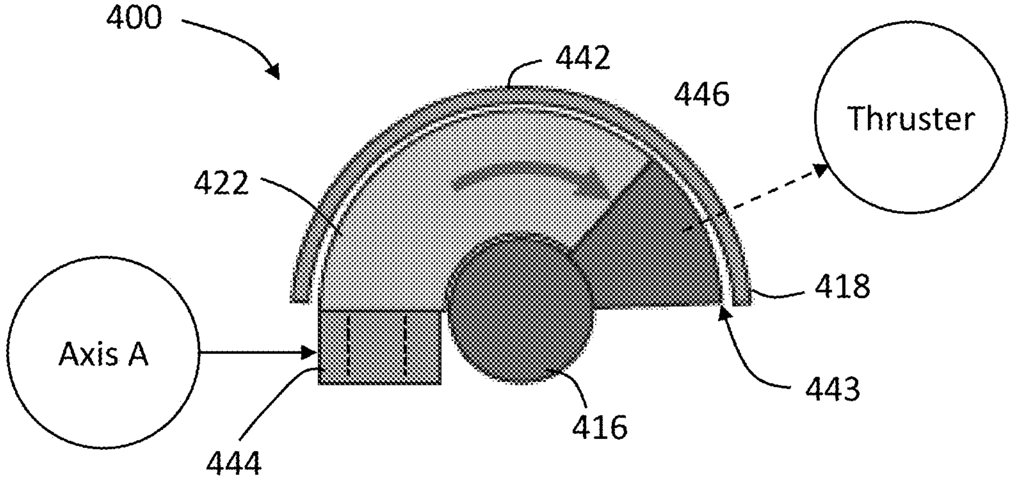

Referring now to FIG. 4A-4B another embodiment is shown of a rotary joint 400. This embodiment is similar to FIG. 3A-3B with a shorter range of motion. In the illustrated embodiment, the rotary joint 400 is used in a second axis assembly to allow fluid flow from the first axis assembly to the thruster. However, this is for example purposes and the claims should not be so limited. The rotary joint 400 may be used in any suitable rotating assembly. In this embodiment, the rotary joint 400 includes a channel guide 418 that includes an outer wall 442. The outer wall 442 is co-axial with a rotatable shaft 416. In an embodiment the outer wall 442 extends over an angle less than 360 degrees, such as 180 degrees for example, such that there is an opening or gap 443 between the ends of the outer wall 442. The rotary joint 400 further includes a fixed port 444 that is fixed relative to the channel guide 418. A rotating port 446 is coupled to, and rotates with, the shaft 416.

Disposed between the fixed port 444 and the rotating port 446 is a bellows 422. The bellows 422 is configured to expand and contract along an arcuate path as the shaft 416 rotates. In an embodiment, the arcuate path is coaxial with the shaft 416 The bellows 422 includes a hollow interior to provide a fluid path between the fixed port 444 and the rotating port 446. In an embodiment, the bellows 422 is sealingly coupled to the fixed port 444 and the rotating port 446 to allow pressurized fluid to pass therethrough. In an embodiment, the fluid is pressurized up to 70 psi. In operation, as the shaft 416 rotates from a first position (FIG. 4A) to a second position (FIG. 4B) the bellows 422 expands. Conversely, as the shaft 416 rotates from the second position to the first position the bellows contracts. In the embodiment of FIG. 4A-4B, the rotating port 446 rotates over a range of about +/−20 degrees.

Referring now to FIG. 5A-5B another embodiment is shown of a rotary joint 500 that may be used to transfer a pressurized fluid through a rotating system, such as a gimbal in a propulsion system for example. The rotary joint 500 may be used in either the first axis assembly 210 or the second axis assembly 212 of FIG. 2. The rotary joint 500 includes a channel guide 518 having an outer wall 542 that is coaxial with a rotating shaft 516. In this embodiment, the channel guide 518 further includes an inner wall 543 that is also coaxial with the outer wall 542 and the shaft 516. Arranged between the inner wall 519 and the outer wall 542 are a first end wall 545 and second end wall 547. The walls 542, 543, 545, 547 cooperate to define a chamber or interior area 548 within the channel guide 518. A pair of opposing end caps (not shown) are provided to enclose the interior area 548. An inlet port 551 is arranged in the first end wall 545. The inlet port 551 allows for fluid communication between a fluid or fuel source 506 and the interior area 548.

Coupled to the second end wall 547 is a bellows 522. In an embodiment, the bellows 522 is disposed entirely within the interior area 548 such that the pressurized fluid within the interior area acts on the outside surfaces of the bellows. This arrangement provides advantages in reducing the risk of, or eliminating, lateral movement of the bellows, sometimes referred to as squirm. It should be appreciated that in this embodiment, while an end 523 of the bellows 522 moves from a first position (FIG. 5A) to a second position (FIG. 5B), the bellows remains in an extended configuration across the arc-shaped path of motion. In other words, when the bellows 522 compresses during the movement, in the second position, the end 523 is angularly spaced apart from the end of the bellows coupled to the second end wall.

Disposed within the bellows 522 is a curved tube member 550. The tube member 550 has an internal passageway 552 that has an open end 554 that is in fluid communication with the interior area. In the illustrated embodiment, the tube member 550 is coupled to the bellows 522 at the end 523. On an end opposite the open end 554, the tube member 550 is coupled to an outlet port 546 that is attached to, and extends from, the shaft 516. The outlet port 546 may be fluidly coupled to another axis assembly or a thruster for example. It should be appreciated that the outlet port 546 rotates with the shaft 516. As a result, as the shaft 516 turns, the tube member 550 rotates along an arc-shaped path about the axis of the shaft 516. The rotation of the tube member 550 causes the tube member to slide within, and also expand and contract, the bellows 522. It should be appreciated that the bellows 522 is sealed to both the end of the tube member 550 and the second end wall 547 to prevent or reduce the risk of pressurized fluid leaking from the interior area 548.

In operation, as the shaft 516 is rotated, the outlet port 546 and tube member 550 will rotate with the shaft causing the bellows to expand and contract. The movement from the first position (FIG. 5A) to the second position (FIG. 5B) causes the end opening 554 to move away from the first end wall 545. It should be appreciated that the fluid from the fuel source 506 will fill the interior area 548 such that fuel will continue to flow into the end opening 554 through the interior passageway 552 to the outlet port 546 during both rotation and while the tube member is in the second position.

It should be further appreciated that while the embodiment of FIG. 5A and FIG. 5B illustrates the bellows 522 as being connected to the second end wall 547, and the tube member 550 exiting via the second end wall 547, in other embodiments, the arrangement of the tube member and the bellows relative to the channel guide 518 may be reversed. In other words, the end 523 of the bellows may be coupled to the first end wall 545 and the tube member 550 may extend out of the first end wall 545.

In an embodiment, the amount angular movement of the tube member 550 is about, or less than, one-half the angular length of the tube member.

One of the advantages of the arrangement of the bellows, and the fluid pressure within the rotary joints is that the spring rate of the bellows and the pressure cooperate to generate a preload force in one direction on the shaft through the entire range of motion of the rotary joint. As a result, in embodiments where a planetary gear is coupled to the shaft, the gears are preloaded in one direction to remove backlash. Due to this, in some embodiments the use of a harmonic drives or other anti-backlash mechanisms is eliminated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It should also be noted that the terms "first", "second", "third", "upper", "lower", and the like may be used herein to modify various elements. These modifiers do not imply a spatial, sequential, or hierarchical order to the modified elements unless specifically stated.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A rotary joint comprising:

a channel guide configured to be disposed coaxial with a shaft; and a bellows operably coupled to a member on a first end and a component on a second end, the bellows operably coupling the member to the component, the bellows being configured to extend along an arc shaped path about the shaft between a first position and a second position, and wherein the bellows comprises an inlet port and an outlet port.

2. The rotary joint of claim 1, wherein:

the member is stationary relative to the channel guide; and the component is configured to rotate with the shaft.

3. The rotary joint of claim 1, wherein:

the member is configured to rotate with the shaft; and the component is configure to rotate about a second shaft independently from the member.

4. The rotary joint of claim 1, wherein the channel guide includes a housing having a curved outer wall, the bellows being disposed between the curved outer wall and the shaft.

5. The rotary joint of claim 4, further comprising an arc shaped conduit coupled between a first end of the bellows and the component.

6. The rotary joint of claim 5, wherein the channel guide includes a curved inner wall disposed between the shaft and the curved outer wall, a first end wall and a second end wall, the curved inner wall, the curved outer wall, the first end wall, and the second end wall cooperating to define an interior space.

7. The rotary joint of claim 6, wherein a second end of the bellows is sealingly coupled to the second end wall and the first end moves between the first position and the second position.

8. The rotary joint of claim 7, wherein the arc shaped conduit is fluidly coupled to the interior space.

9. The rotary joint of claim 8, wherein the channel guide includes a port configured to fluidly couple the interior space to a fluid source.

* * * * *